United States Patent [19]

Sasano et al.

[11] Patent Number: 5,255,620
[45] Date of Patent: Oct. 26, 1993

[54] APPARATUS FOR ADJUSTING THE SIZE OF A SEWING MACHINE PATTERN

[75] Inventors: Akiyoshi Sasano; Haruhiko Tanaka, both of Tokyo, Japan

[73] Assignee: Janome Sewing Machine Co., Ltd., Tokyo, Japan

[21] Appl. No.: 957,959

[22] Filed: Oct. 8, 1992

[51] Int. Cl.$^5$ ............................................. D05B 21/00
[52] U.S. Cl. .................................. 112/121.12; 112/445
[58] Field of Search ................... 112/121.12, 103, 456, 112/458, 445, 102

[56] References Cited

U.S. PATENT DOCUMENTS

| | | | |
|---|---|---|---|
| 4,796,551 | 1/1989 | Nukushina | 112/456 X |
| 4,823,714 | 4/1989 | Yokoe et al. | 112/103 |
| 4,892,050 | 1/1990 | Ando et al. | 112/456 |
| 5,025,740 | 6/1991 | Horie et al. | 112/458 X |

FOREIGN PATENT DOCUMENTS

55-73287 6/1980 Japan.

*Primary Examiner*—Peter Nerbun
*Attorney, Agent, or Firm*—Lowe, Price, LeBlanc & Becker

[57] ABSTRACT

An apparatus for adjusting the size of a sewing machine pattern for use in a sewing machine is disclosed. The apparatus includes a stitch data storage device for storing stitch data corresponding to each of a plurality of embroidery patterns; a pattern selecting device for selecting a desired one of the plurality of patterns stored in the storage device; a magnification selecting device capable of being manually operated for adjusting the size of the pattern; a magnification displaying device for displaying an adjustment value selected by the magnification selecting device; a key code determining device for determining the stitch data to be valid or invalid on the basis of a relevant one of key codes respectively added to a plurality of items of stitch data for forming the pattern in correspondence with the adjustment value selected; and a size adjusting device for adjusting the size of the pattern in correspondence with the adjustment value selected.

7 Claims, 9 Drawing Sheets

APPARATUS FOR ADJUSTING THE SIZE OF A SEWING MACHINE PATTERN

BACKGROUND OF THE INVENTION

1. Field of the Invention

The present invention relates to an apparatus for adjusting the size of a pattern of a sewing machine capable of embroidering, and more particularly to an apparatus for adjusting the size of a pattern of a sewing machine capable of forming an embroidery pattern without calculation of new stitch data at the time of size adjustment.

2. Description of the Related Art

In sewing machines capable of embroidering, the following two methods in the storage and reading of embroidery are known:

(1) A method in which all the stitch data are stored in advance in a storage means, and the stitch data is consecutively read in response to timing signals so as to form a pattern.

(2) A method in which, at the time of an embroidering start, stitch data created and is temporarily stored on the basis of apex data for each block of a pattern stored in advance in the storage means, and the stitch data thus stored is consecutively read in response to timing signals so as to form a pattern.

In the former method, since calculation is not required in forming embroidery stitches, the formation of stitches can be started immediately after selection of a pattern; however, a large storage capacity is required. For this reason, in order to be provided with a large number of embroidery patterns and to be provided with pattern data for each size to effect enlargement or reduction of the patterns, a very large data storage capacity is necessary.

In the latter method, the enlargement and reduction of patterns are readily possible, and a large number of patterns can be stored. However, calculation from apex data to stitch data is required at an embroidering start, so that it is impossible to start sewing immediately, and a storage means for temporarily storing the stitch data obtained by calculation is required.

SUMMARY OF THE INVENTION

Accordingly, it is an object of the present invention to provide a controller for enabling the enlargement and reduction of a pattern without requiring a large storage capacity in a sewing machine using the above-described former method in which all the stitch data are stored in advance in a storage means, and the stitch data is consecutively read in response to timing signals so as to form a pattern.

The apparatus for adjusting the size of a sewing machine pattern in accordance with one aspect of the present invention comprises: stitch forming means including a vertically movable needle and a needle-thread capturing means which cooperates with the needle; rotational phase detecting means for generating a timing signal in synchronism with a vertical motion of the needle; cloth moving means for moving cloth relative to the needle in response to the timing signal; stitch data storage means for storing stitch data corresponding to each of a plurality of embroidery patterns; pattern selecting means for selecting a desired one of the plurality of patterns stored in the storage means; display means for displaying the pattern selected; magnification selecting means capable of being manually operated for adjusting the size of the pattern; magnification displaying means for displaying an adjustment value selected by the magnification selecting means; key code determining means for determining the stitch data to be valid or invalid on the basis of a relevant one of key codes respectively associated with a plurality of items of stitch data for forming the pattern in correspondence with the adjustment value selected; and size adjusting means for adjusting the size of the pattern in correspondence with the adjustment value selected, wherein size adjustment is made with respect to stitch data which are consecutively read and determined to be valid.

In accordance with another aspect of the present invention, the apparatus for adjusting the size of a sewing machine pattern comprises: stitch forming means including a vertically movable needle and a needle-thread capturing means which cooperates with the needle; rotational phase detecting means for generating a timing signal in synchronism with a vertical motion of the needle; cloth moving means for moving an embroidery frame with cloth stretched thereon in an X-axis direction and in a Y-axis direction perpendicular thereto in response to the timing signal; stitch data storage means for storing stitch data corresponding to each of a plurality of embroidery patterns; pattern selecting means for selecting a desired one of the plurality of patterns stored in the storage means; display means for displaying the pattern selected; magnification selecting means capable of being manually operated for adjusting the size of the pattern; magnification displaying means for displaying an adjustment value selected by the magnification selecting means; number-of-stitches determining means for classifying the number of stitches into one of a plurality of stages in correspondence with the adjustment value selected; key code determining means for determining the stitch data to be valid or invalid on the basis of a relevant one of key codes respectively associated with a plurality of items of stitch data for forming the pattern in correspondence with the number of stitches determined; and size adjusting means for adjusting the size of the pattern in correspondence with the adjustment value selected, wherein size adjustment is made with respect to stitch data which are consecutively read and determined to be valid.

BRIEF DESCRIPTION OF THE DRAWINGS

FIGS. 6(a) to 6(c) are diagrams illustrating embroidery patterns subjected to 3/3 to ⅓ processing

DETAILED DESCRIPTION OF THE PREFERRED EMBODIMENTS

First Embodiment

Referring now to the accompanying drawing, a description will be given of a first embodiment of the present invention.

Figure 7:
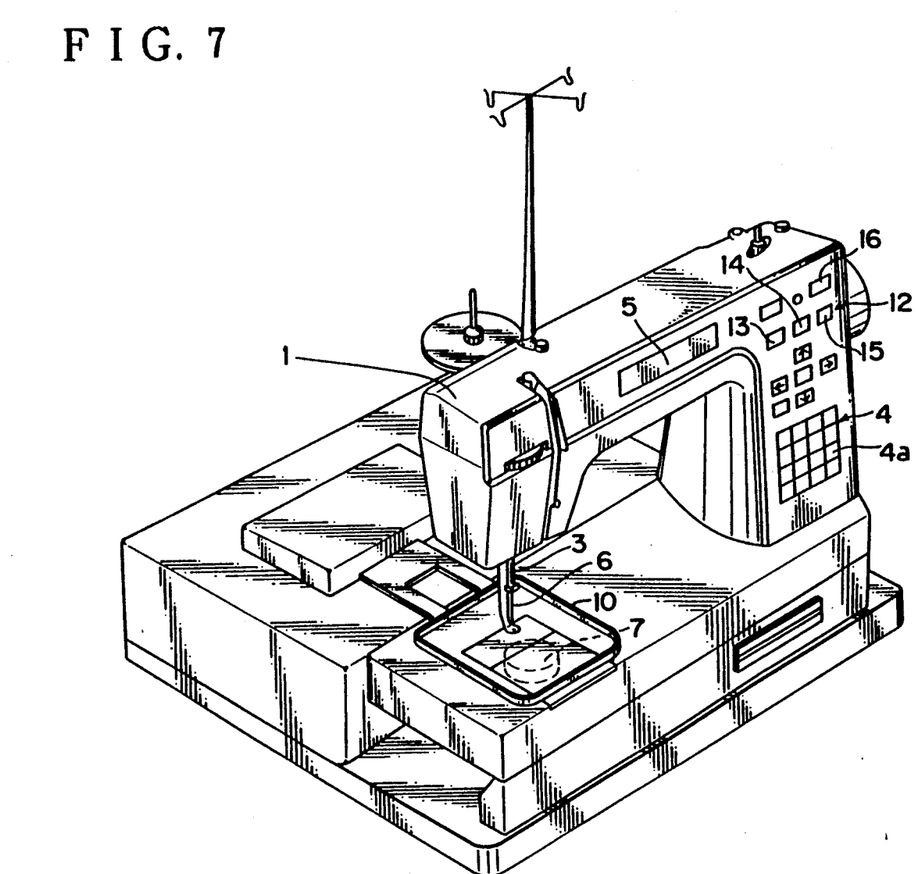
FIG. 7 is a perspective view of an embroidery sewing machine.

FIG. 7 is an external appearance diagram of a sewing machine in accordance with the present invention.

It should be noted that, in this embodiment, the vertical reciprocating movement of a needle, the movement of a hook of a needle-thread capturing means, a driving mechanism for driving an embroidery frame for stretching embroidery cloth, and so on, are identical to those of general sewing machines capable of embroidering, so that a detailed description thereof will be omitted.

In FIG. 7, a pattern selecting means 4 is provided with selecting keys 4a corresponding to respective patterns depicted thereon. By operating a relevant key, a desired pattern can be selected.

The pattern thus selected is displayed on a pattern displaying means 5 constituted by a LCD or the like.

A magnification selecting means 12 is disposed on a sewing machine frame 1 in such a manner as to be controllable by the operator. The magnification selecting means 12 comprises a "large key" 13 for selecting a large pattern, a "medium key" 14 for selecting a pattern of a medium size, and a "small key" 15 for selecting a small pattern. A selection signal is generated as each key is operated.

A magnification displaying means 16 displays the magnification selected by the magnification selecting means 12 on a display such as a LCD.

A driving shaft (not shown), which is coupled to a sewing machine motor (not shown), i.e., a driving source, and to which torque is transmitted from the sewing machine motor, is rotatably supported in the sewing machine frame 1. A needle bar 3 connected to the driving shaft is supported by the sewing machine frame 1 in such a manner as to be vertically movable. A needle 6 is secured to a tip of the needle bar.

A hook 7, which rotates in synchronism with the vertical movement of the needle bar 3, is rotatably supported in the sewing machine frame 1 below the needle bar 3, and is adapted to form stitches in cooperation with the needle 3.

Figure 1:
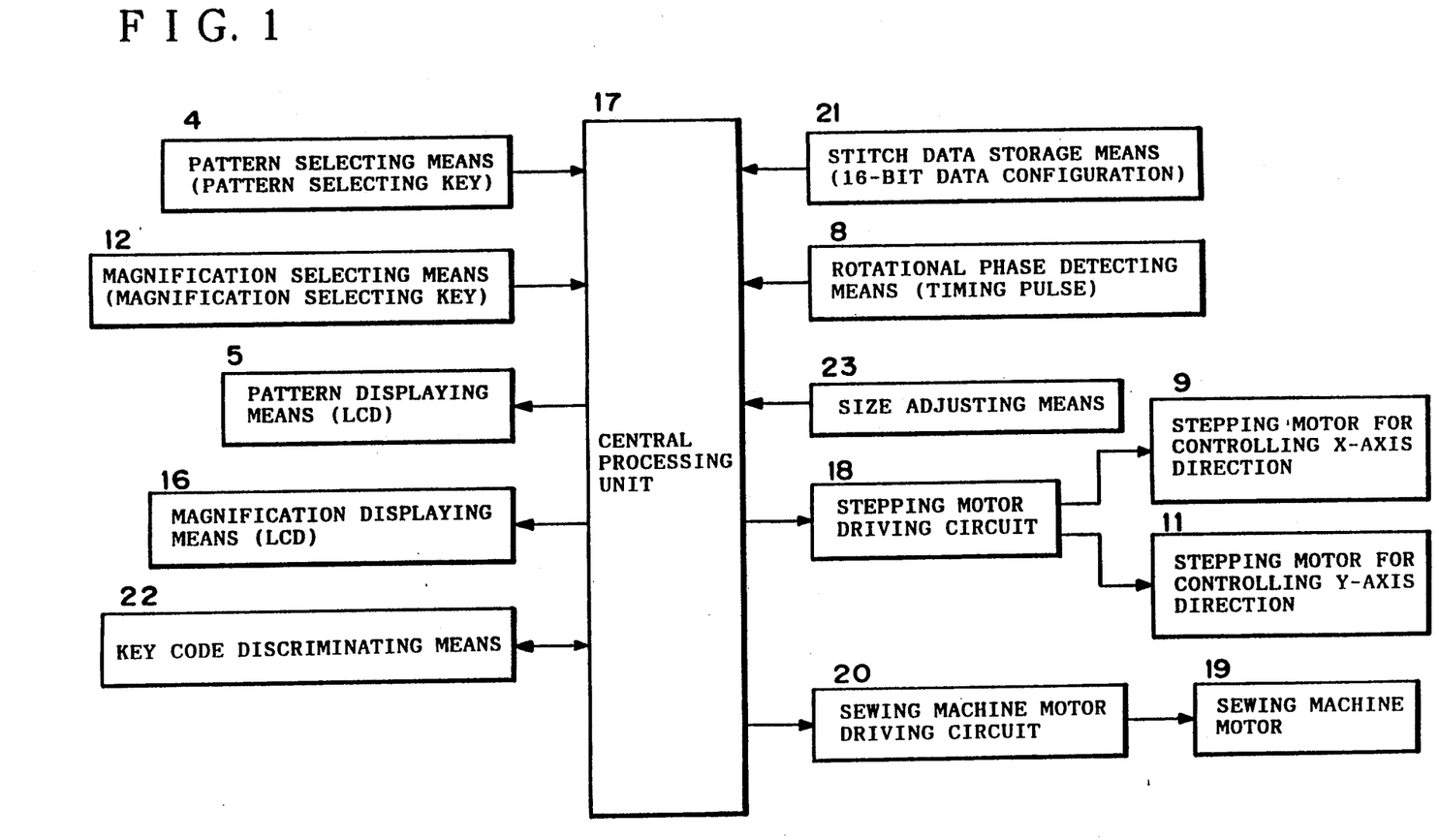
FIG. 1 is a control block diagram.
Figure 10:
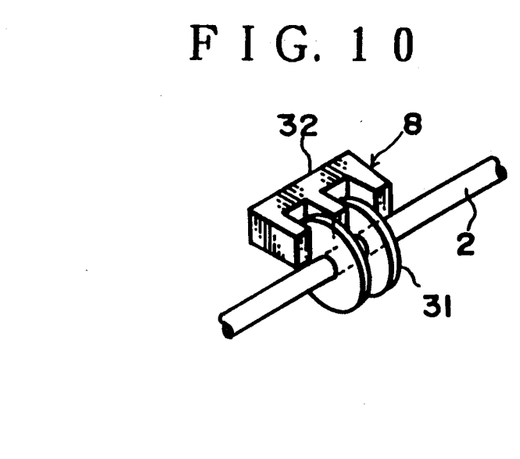
FIG. 10 is a diagram illustrating a rotational phase detecting means.

In addition, in FIG. 1, a stepping motor 9 for controlling the X-axis direction is secured to the sewing machine frame 1, and is coupled thereto via a driving mechanism (not shown) for driving an embroidery frame 10 in the X-direction. A stepping motor 11 for controlling the Y-direction is also secured to the sewing machine frame 1, and is coupled thereto via a driving mechanism (not shown) for driving the embroidery frame 10 in the Y direction. A rotational phase detecting means 8 is comprised of a rotating disk 31 secured to a driving shaft 2 as well as a photo-interruptor 32 secured to the sewing machine frame 1, as shown in FIG. 10.

Since the details of phase detection by the rotational phase detecting means 8 are identical to those of known arrangements such as disclosed in Japanese Patent Application Laid-Open No. 73287/1980 filed earlier by the present applicant, a description thereof will be omitted.

In addition, the aforementioned pattern selecting means 4, magnification selecting means 12, pattern displaying means 5, magnification displaying means 16, and rotational phase detecting means 8 are connected to a central processing unit 17.

The stepping motor 9 for controlling the X-axis and the stepping motor 11 for controlling the Y-axis are connected to the central processing unit 17 via a stepping motor driving circuit 18. A sewing machine motor 19 for driving the aforementioned stitch forming means is connected to the central processing unit 17 via a sewing machine driving circuit 20.

A stitch-data storage means (ROM) 21 stores 16-bit stitch data consisting of address No., key code, and stitch coordinate data with respect to each pattern.

Figure 3:
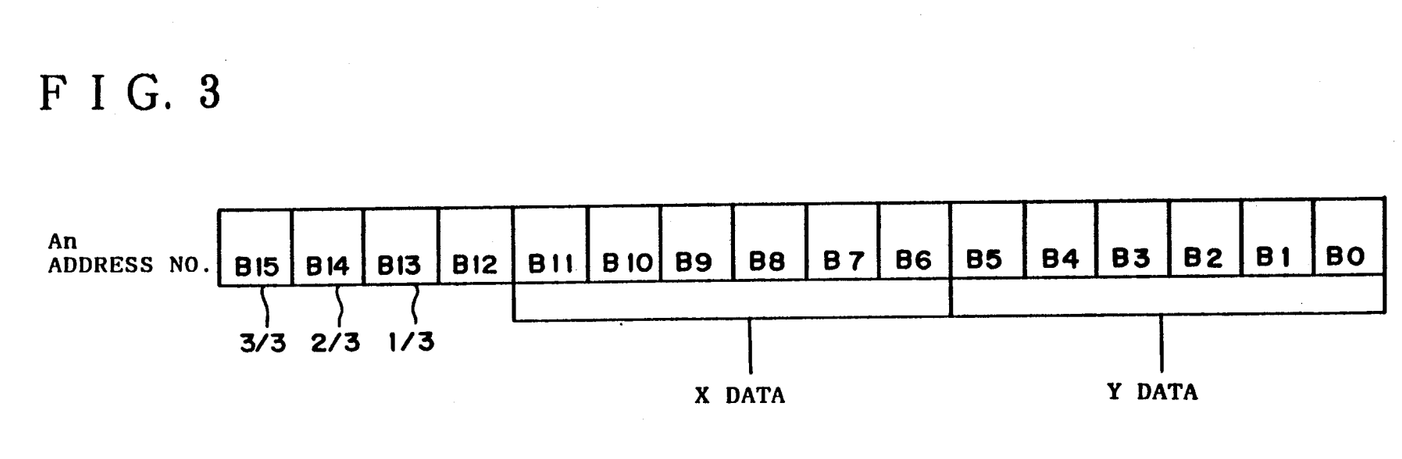
FIG. 3 is a diagram illustration of a configuration of stitch data.

The configuration of stitch data stored in the storage means is depicted in FIG. 3, wherein the first four bits are allotted to the key code the ensuing six bits to X data of the stitch coordinate data, and the last six bits to the Y data thereof.

The first bit (B15) in the key code represents a full size (3/3), and this bit is set to "1" when it is used by the coordinate data when a large pattern is selected, and to "0" when it is not used.

The ensuing bit (B14) represents a medium size ($\frac{2}{3}$), and this bit is set to "1" when it is used by the coordinate data when a medium-size pattern is selected, and to "0" when it is not used.

The ensuing bit (B13) represents a small size ($\frac{1}{3}$), and this bit is set to "1" when it is used by the coordinate data when a small pattern is selected, and to "0" when it is not used.

A key code discriminating means 22 is connected to the central processing unit 17 to determine the stitch formation as being valid or invalid on the basis of the key code of the stitch data in response to an input signal of magnification selected by the magnification selecting means 12.

A size adjusting means 23 is connected to the central processing unit 17 to effect reduction magnification processing with respect to the X, Y data for frame movement, which is instructed on the basis of the coordinate data, in response to the input signal of magnification selected by the magnification selecting means 12.

Figure 2:
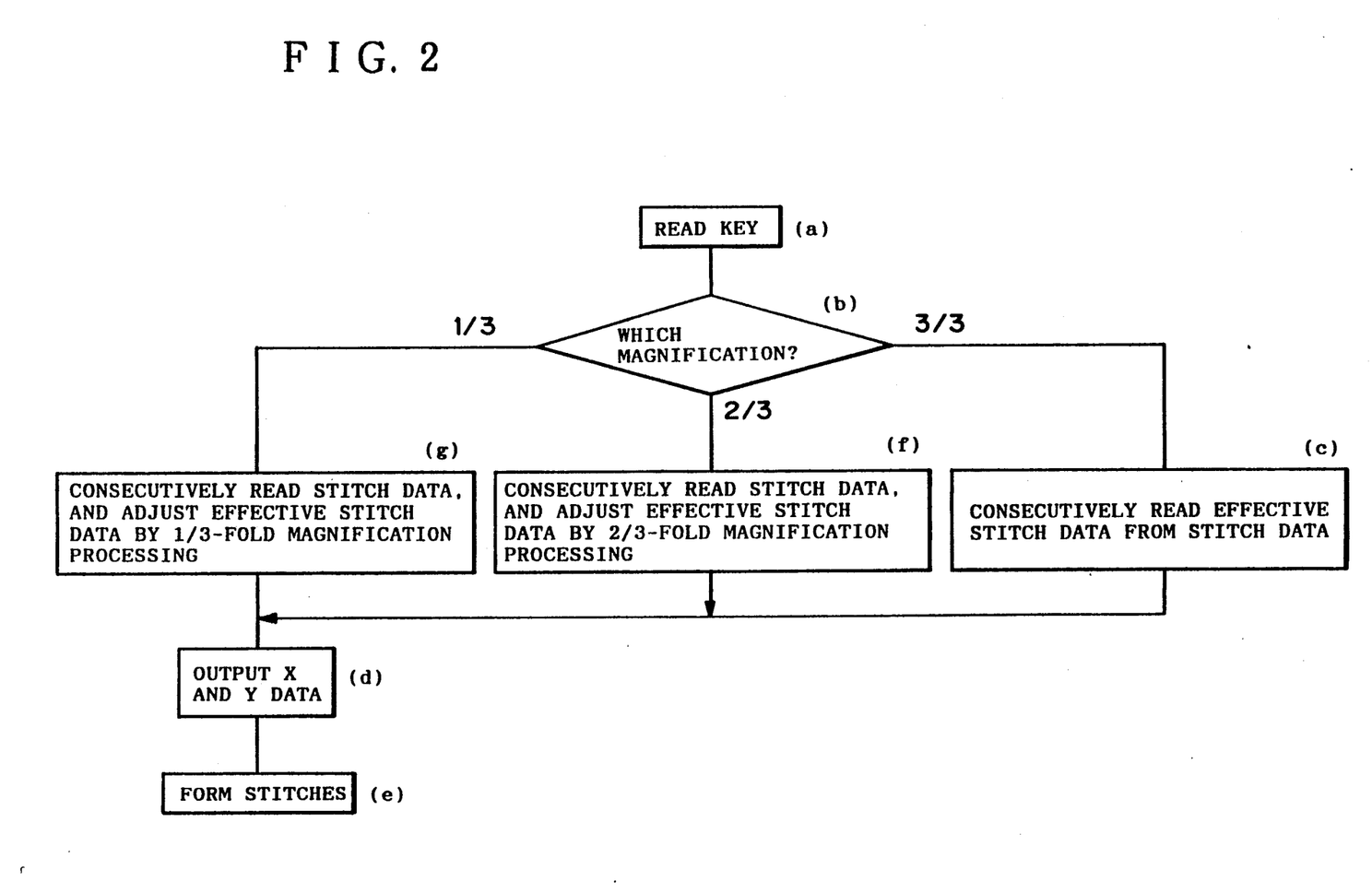
FIG. 2 is a flowchart illustrating a magnification selecting system in accordance with a first embodiment.

As depicted in FIG. 2, the magnification processing is started by the key operation of the magnification selecting key 12, and the discrimination of the signal of the magnification selecting key is effected in steps (a) and (b).

If the "large key" 13 is operated and the selection signal is outputted, a determination is made in step (a) that there is no need for adjustment of the enlargement or reduction of the pattern. Then, in step (c), stitch coordinate data which is provided with a key code for rendering the pattern formation effective is read from the stitch data stored in advance in the stitch data storage means.

In step (d), the X and Y data are outputted to the stepping motor driving circuit 18, and the the stepping motor 9 for controlling the X-axis direction and the stepping motor 11 for controlling the Y-axis direction are driven in synchronism with the operation of the stitch forming mechanism, thereby forming a large pattern.

If the "medium key" 14 of the magnification selecting key 12 is operated and the selection signal is outputted, a determination is made in step (b) that the case is ($\frac{2}{3}$-fold) magnification processing.

In step (f), the stitch data is read, stitch coordinate data which is provided with a key code determined to be valid is read, and adjustment is made by multiplying the same by a reduction rate ⅓, thereby obtaining stitch forming data.

In an ensuing step (d), the X and Y data are outputted to the stepping motor driving circuit 18, and the stepping motor 9 for controlling the X-axis direction and the stepping motor 11 for controlling the Y-axis direction are driven in synchronism with the operation of the stitch forming mechanism, thereby forming a medium-size pattern.

If the "small key" 15 of the magnification selecting means 12 is operated and the selection signal is outputted, a determination is made in step (b) that the case is (⅓-fold) magnification processing. In step (g), the stitch data are read, stitch coordinate data which is provided with a key code determined to be valid are read, and adjustment is made by multiplying the same by a reduction rate ⅓, thereby obtaining stitch forming data.

In an ensuing step (d), the X and Y data are outputted to the stepping motor driving circuit 18, and the stepping motor 9 for controlling the X-axis direction and the stepping motor 11 for controlling the Y-axis direction are driven in synchronism with the operation of the stitch forming mechanism, thereby forming a small pattern.

Figure 4:
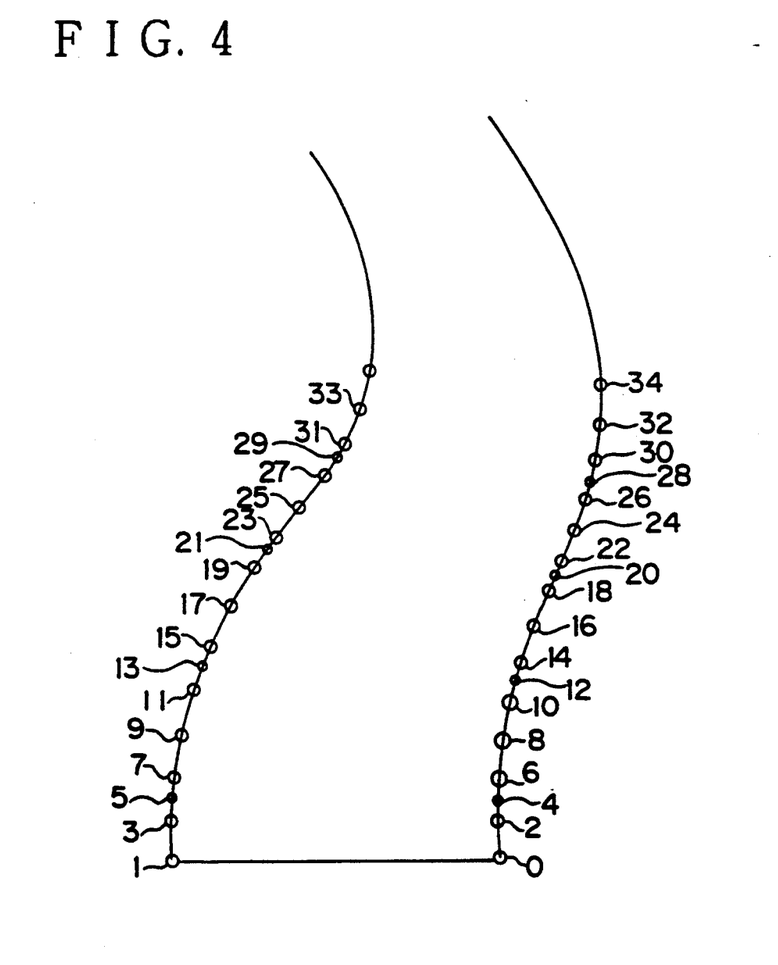
FIG. 4 is a diagram illustrating stitch forming points of a pattern.

A description will now be given as to the details of the operation of this invention, through an example wherein the pattern depicted in FIG. 4 is formed.

In FIG. 4, the stitch data on points, indicated by data 0 to data 34, have an address configuration as depicted in Table 1 below. As depicted in FIG. 3, the configuration at each address comprises the key codes B15 to B12, which are data for designating the full size (3/3), medium-size (⅔), and small size (⅓) in terms of the number of stitches, as well as stitch coordinate data B11 to B0.

TABLE 1

| Address No. | B15 Full Size | B14 2/3 | B13 1/3 | B12 | B11 | B10 | B9 | B8 | B7 | B6 | B5 | B4 | B3 | B2 | B1 | B0 |
|---|---|---|---|---|---|---|---|---|---|---|---|---|---|---|---|---|
| A0 | 1 | 1 | 1 | | | | | | | | | | | | | |
| A1 | 1 | 1 | 1 | | | | | | | | | | | | | |
| A2 | 1 | 0 | 0 | | | | | | | | | | | | | |
| A3 | 1 | 0 | 0 | | | | | | | | | | | | | |
| A4 | 0 | 1 | 0 | | | | | | | | | | | | | |
| A5 | 0 | 1 | 0 | | | | | | | | | | | | | |
| A6 | 1 | 0 | 0 | | | | | | | | | | | | | |
| A7 | 1 | 0 | 0 | | | | | | | | | | | | | |
| A8 | 1 | 1 | 1 | | | | | | | | | | | | | |
| A9 | 1 | 1 | 1 | | | | | | | | | | | | | |
| A10 | 1 | 0 | 0 | | | | | | | | | | | | | |
| A11 | 1 | 0 | 0 | | | | | | | | | | | | | |
| A12 | 0 | 1 | 0 | | | | | | | | | | | | | |
| A13 | 0 | 1 | 0 | | | | | | | | | | | | | |
| A14 | 1 | 0 | 0 | | | | | | | | | | | | | |
| A15 | 1 | 0 | 0 | | | | | | | | | | | | | |
| A16 | 1 | 1 | 1 | | | | | | | | | | | | | |
| A17 | 1 | 1 | 1 | | | | | | | | | | | | | |
| A18 | 1 | 0 | 0 | | | | | | | | | | | | | |
| A19 | 1 | 0 | 0 | | | | | | | | | | | | | |
| A20 | 0 | 1 | 0 | | | | | | | | | | | | | |
| A21 | 0 | 1 | 0 | | | | | | | | | | | | | |
| A22 | 1 | 0 | 0 | | | | | | | | | | | | | |
| A23 | 1 | 0 | 0 | | | | | | | | | | | | | |
| A24 | 1 | 1 | 1 | | | | | | | | | | | | | |
| A25 | 1 | 1 | 1 | | | | | | | | | | | | | |
| A26 | 1 | 0 | 0 | | | | | | | | | | | | | |
| A27 | 1 | 0 | 0 | | | | | | | | | | | | | |
| A28 | 0 | 1 | 0 | | | | | | | | | | | | | |
| A29 | 0 | 1 | 0 | | | | | | | | | | | | | |
| A30 | 1 | 0 | 0 | | | | | | | | | | | | | |
| A31 | 1 | 0 | 0 | | | | | | | | | | | | | |
| A32 | 1 | 1 | 1 | | | | | | | | | | | | | |
| A33 | 1 | 1 | 1 | | | | | | | | | | | | | |
| A34 | 1 | 0 | 0 | | | | | | | | | | | | | |
| A35 | 1 | 0 | 0 | | | | | | | | | | | | | |

Figure 5:
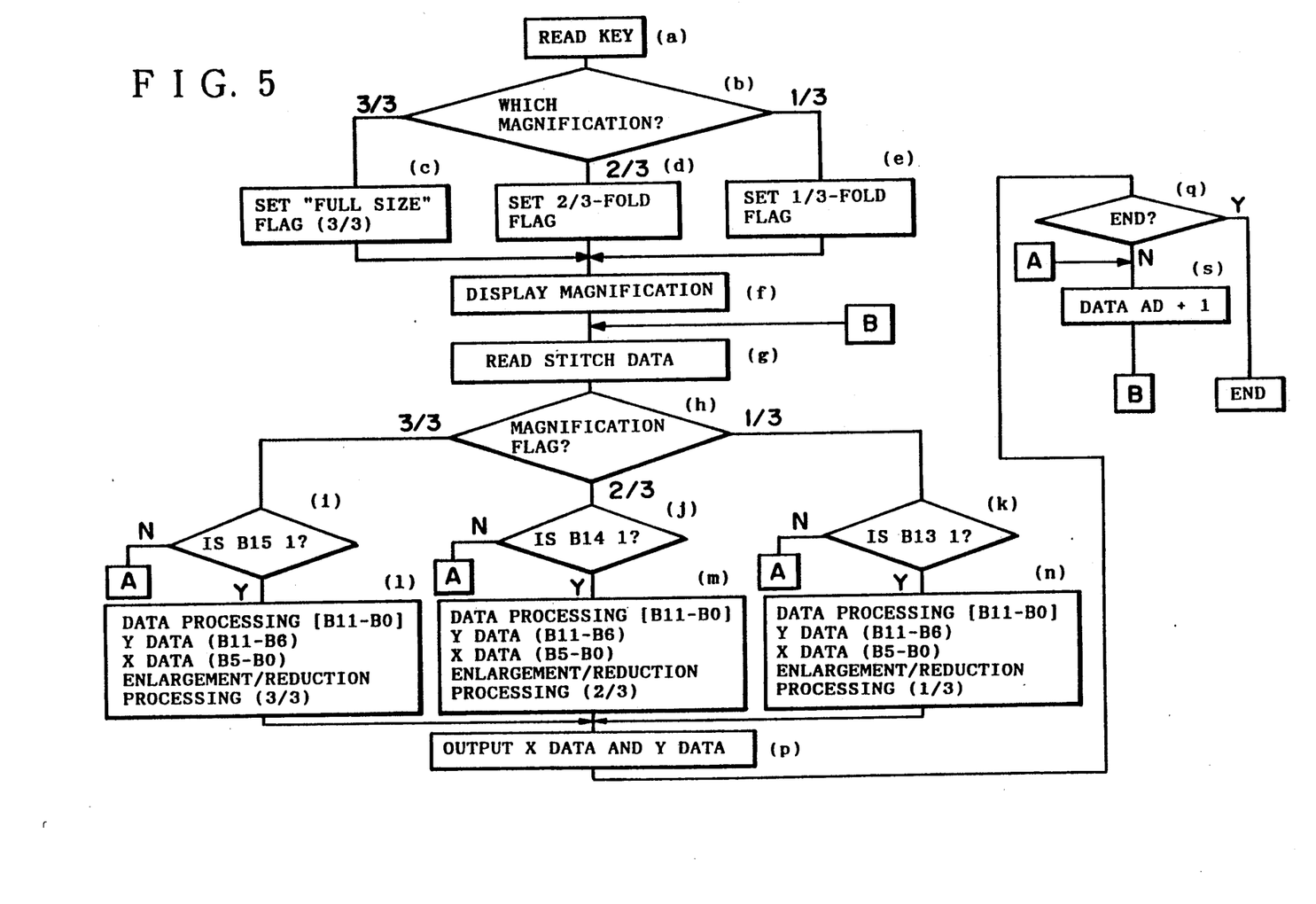
FIG. 5 is a flowchart for stitch formation processing.

Referring to the flowchart in FIG. 5, a detailed description will be given of the operation.

First, a description will be given by citing an example in which the "large key" 13 is operated and full-size magnification is selected.

Upon operation of the magnification selecting means 12, the key signal is read in step (a). In step (b), a determination is made of the magnification selected.

With respect to the selection signal of the "large key (3/3)" 13, a "full-size" flag is set in step (c).

Then in step (f), a signal is outputted to the magnification displaying means 16 to display the magnification (3/3).

In step (g), the stitch data at the first data address is read, and a determination of the magnification flag is made in an ensuing step (h).

Since the flag is the "full-size" flag (3/3), the "key code" B15 is looked up in step (i).

As shown in Table 1, since B15 at the address A0 is "1," a determination is made that it is "valid," and the X data and the Y data are subjected to data processing in step (l).

Since the address A0 represents first stitch data, in step (p) the coordinate data are outputted as they are, to form a stitch.

In step (q), a determination is made as to whether or not processing ends, and if it does not end, in step (s) the data address is updated, and the stitch data of an ensuing address A1 is read.

Since B15 of A1 is "1" and "valid," data processing is carried out in step (l).

Namely, the difference between the coordinate data of A0 and the coordinate data of A1 in both X- and Y-directions is set as an amount of output, and is outputted in step (p), to form a stitch.

In step (q), a determination is made as to whether or not processing ends, and if it does not end, in step (s) the data address is updated and the stitch data at an ensuing address A2 is read.

Since B15 of A2 and A3 is "1, " a determination is made that it is "valid, and data processing is carried out in step (l) in which the difference with the previous coordinate data is set as an amount of output and is outputted in step (p), to form a stitch.

In step (q), a determination is made as to whether or not processing ends, and if it does not end, in step (s) the data address is updated and the stitch data at an ensuing address A4 is read.

Since B15 of A4 is "0, " a determination is made that it is "invalid, " so that the operation jumps immediately to step (s) to update the data address, and the stitch data at an ensuing address A5 is read.

Since B15 of A5 is also "0," a determination is made that it is "invalid," so that the operation jumps immediately to step (s) to update the data address, and the stitch data at an ensuing address A6 is read.

Since B15 of A6 is "1," a determination is made that it is "valid," so that data processing is carried out in Step (l).

Namely, the difference between the previously valid coordinate data of A3 and the coordinate data of A6 in both X- and Y-directions is set as an amount of output, and is outputted in step (p), to form a stitch.

Thereafter, in the same manner, the coordinate data is set to be "valid" in the case of "1" and "invalid" in the case of "0" in accordance with the key code of B15, whereby an embroidery pattern corresponding to the selected magnification of the "large key" 13 is formed.

A description will now be given of an example wherein the "medium key" 14 of the magnification selecting means 12 is selected.

Upon operation of the magnification selecting means 12, the key signal is read in step (a). Then, in step (b), a determination is made of the magnification selected.

With respect to the selection signal of the "medium key (⅔)" 14, a "⅔-fold" flag is set in step (d).

Then in step (f), a signal is outputted to the magnification displaying means 16 to display the magnification (⅔).

Then in step (g), the stitch data at the first data address is read, and a determination of the magnification flag is made in an ensuing step (h).

Since the flag is the "⅔" flag (⅔), the "key code" B14 is looked up in step (j).

Since B14 at the address A0 is "1" and "valid," the X data and the Y data are subjected to data processing in step (m).

Since the address A0 represents first stitch data, in step (p) the coordinate data are outputted as is, to form a stitch.

In step (q), a determination is made as to whether or not processing ends, and if it does not end, in step (s) the data address is updated, and the stitch data of an ensuing address A1 is read.

Since B14 of A1 is "1" and "valid," data processing is carried out in step (m).

Namely, an amount of output is calculated by conducting a (⅔-fold) magnification processing by the size adjusting means with respect to the difference between the coordinate data of A0 and the coordinate data of A1 in both X- and Y-directions, and is outputted in step (p), to form a stitch.

In step (q), a determination is made as to whether or not processing ends, and if it does not end, in step (s) the data address is updated and the stitch data at an ensuing address A2 is read.

Since B14 of A2 is "0" and "invalid," the operation jumps immediately to step (s) to update the data address, and the stitch data at an ensuing address A3 is read.

Since B14 of A3 is also "0" and "invalid," the operation jumps immediately to step (s) to update the data address, and the stitch data at an ensuing address A4 is read.

Since B14 of A4 is "1" and "valid," data processing is carried out in Step (m). Namely, an amount of output is calculated by conducting (⅔-fold) magnification processing by the size adjusting means with respect to the difference between the coordinate data of A1 and the coordinate data of A4 in both X- and Y-directions, and is outputted in step (p), to form a stitch.

Thereafter, in the same manner, the coordinate data is set to be "valid" in the case of "1" and "invalid" in the case of "0" in accordance with the key code of B14, whereby an embroidery pattern corresponding to the selected magnification of the "medium key" 14 is formed.

A description will now be given of a case where the "small key" 15 of the magnification selecting means 12 is selected.

Upon operation of the magnification selecting means 12, the key signal is read in step (a). Then, in step (b), a determination is made of the magnification selected.

With respect to the selection signal of the "small key (⅓)" 15, a "⅓-fold" flag is set in step (e).

In step (f), a signal is outputted to the magnification displaying means 16 to display the magnification (⅓).

Then, in step (g), the stitch data at the first data address is read, and a determination of the magnification flag is made in an ensuing step (h).

Since the flag is the "⅓-fold" flag, the "key code" B13 is looked up in step (k).

Since B13 at the address A0 is "1" and therefore determined to be "valid," the X data and Y data are subjected to data processing in step (n).

Since the address A0 represents first stitch data, in step (p) the coordinate data are outputted as is, to form a stitch.

In step (q), a determination is made as to whether or not processing ends, and if it does not end, in step (s) the data address is updated, and the stitch data of an ensuing address A1 is read.

Since B13 of A1 is "1" and "valid," data processing is carried out in step (n).

Namely, an amount of output is calculated by conducting (⅓-fold) magnification processing by the size adjusting means with respect to the difference between the coordinate data of A0 and the coordinate data of A1 in both the X- and Y-directions, and is outputted in step (p), to form a stitch.

In step (q), a determination is made as to whether or not processing ends, and if it does not end, in step (s) the data address is updated and the stitch data at an ensuing address A2 is read.

Since B13 of A2 is "0" and "invalid," the operation jumps immediately to step (s) to update the data address, and the stitch data at an ensuing address A8 is read.

Since B13 of A3 to A7 is also "0" and "invalid," the operation consecutively jumps to step (s) to update the data address, and the stitch data at an ensuing address A4 is read.

Since B13 of A8 is "1" and therefore determined to be "valid," data processing is carried out in Step (n).

Namely, an amount of output is calculated by conducting (⅓-fold) magnification processing by the size adjusting means with respect to the difference between the coordinate data of A1 and the coordinate data of A8 in both X- and Y-directions, and is outputted in step (p), to form a stitch.

In step (q), a determination is made as to whether or not processing ends, and if it does not end, in step (s) the data address is updated and the stitch data at an ensuing address A9 is read.

Since B13 of A9 is "1" and "valid," data processing is carried out in step (n).

Namely, an amount of output is calculated by conducting (⅓-fold) magnification processing by the size adjusting means with respect to the difference between the coordinate data of A9 and the coordinate data of A8 in both X- and Y-directions, and is outputted in step (p), to form a stitch.

In step (q), a determination is made as to whether or not processing ends, and if it does not end, in step (s) the data address is updated and the stitch data at an ensuing address A10 is read.

Since B13 of A10 is "0" and "invalid, " the operation immediately jumps to step (s) to update the data address, and the stitch data at an ensuing address A11 is read.

Thereafter, in the same manner, the coordinate data is set to be "valid" in the case of "1" and "invalid" in the case of "0" in accordance with the key code of B13, whereby an embroidery pattern corresponding to the selected magnification of the "small key" 15 is formed.

The embroidery patterns thus formed are depicted in FIGS. 6a to 6c. In contrast to the embroidery pattern of the "full size" shown in FIG. 6a, in the pattern of "medium size" in FIG. 6b and the pattern of "small size" in FIG. 6c, the number of stitches formed is reduced in correspondence with the reduction rate. Therefore, a stitch pitch P is constantly formed with the same value as that of the "full size" pattern without being related to the reduction rate.

Second Embodiment

Figure 11:
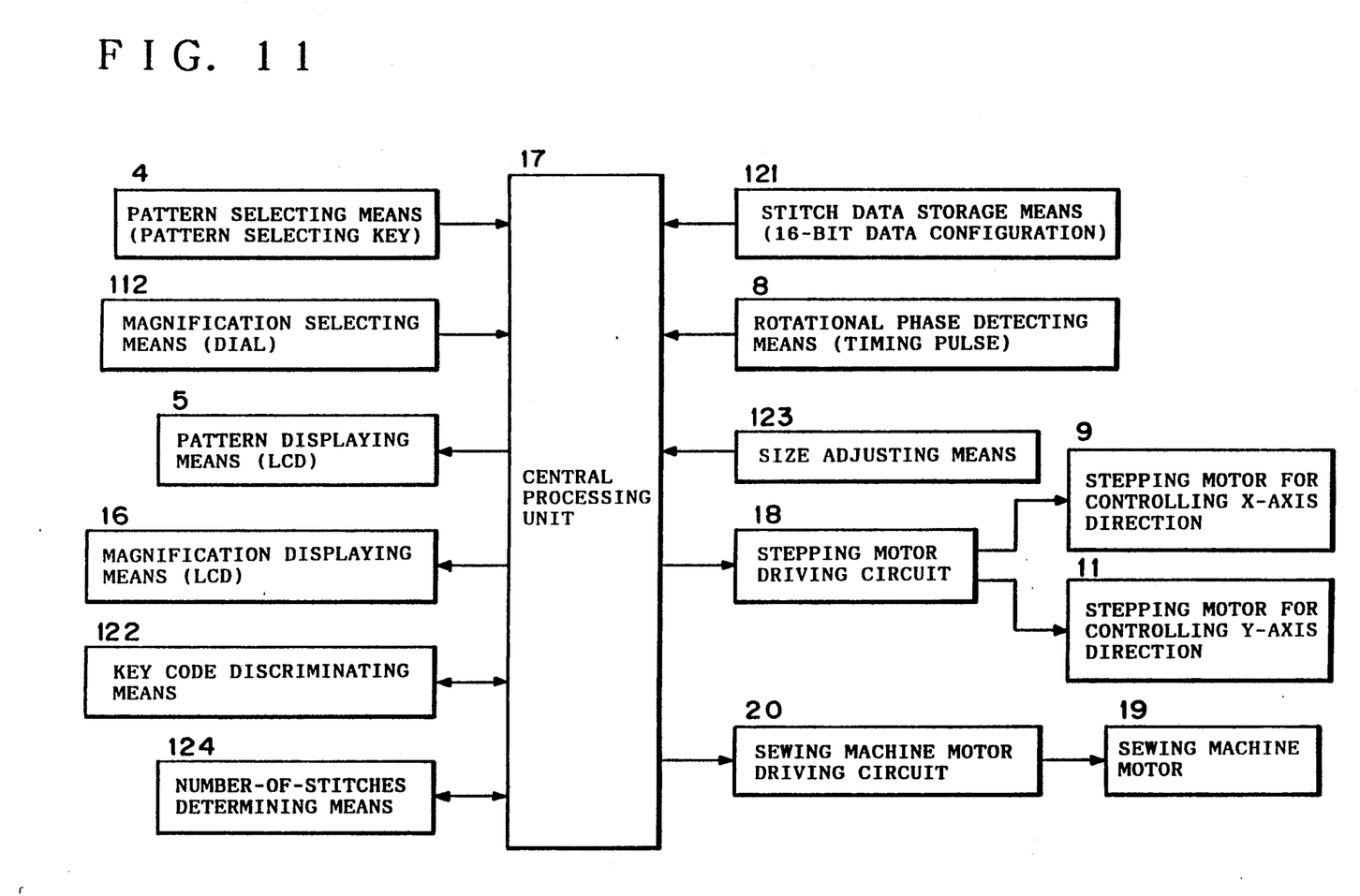
FIG. 11 is a control block diagram in accordance with the second embodiment.

A control block diagram of a second embodiment is shown in FIG. 11.

Figure 8:
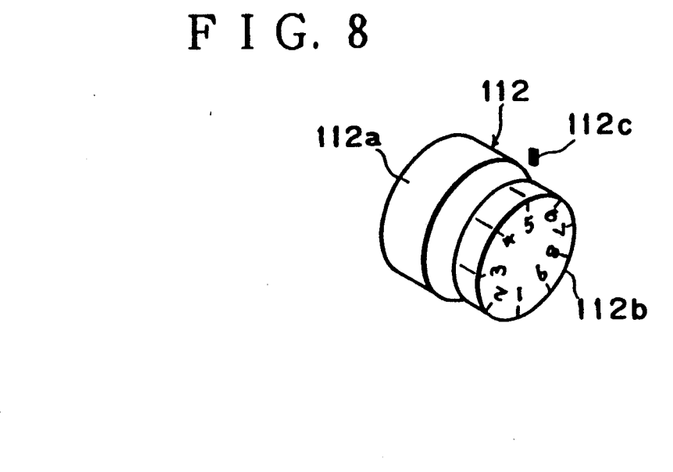
FIG. 8 is a diagram illustrating a magnification selecting means.

In the second embodiment, as shown in FIG. 8, a magnification selecting means 112 is arranged such that a manually adjustable dial 112b provided with graduations 1 to 9 is fitted on a shaft of a potentiometer 112a secured to the sewing machine frame 1. As a desired graduation is adjusted to a mark 112c displayed on the sewing machine frame 1, a signal corresponding to the graduation is outputted.

A number-of-stitches determining means 124 determines the number of stitches among stitches set in a plurality of stages with respect to the input signal of the adjusting value selected, i.e., for classifying the dial graduation value and the number of stitches (stitch flag value), as set forth in Table 2 below. This number-of-stitches determining means 124 is connected to the central processing unit 17.

TABLE 2

| Dial Value (1–9) | No. of stitches (1/3–3/3) | Enlargement/Reduction Rate (%) | Pitch (in a case where average is set to 2) |
|---|---|---|---|
| 9 | 3/3 | 110 | 2.2 |
| 8 | 3/3 | 100 | 2.0 |
| 7 | 3/3 | 88 | 1.76 |
| 6 | 2/3 | 77 | 2.33 |
| 5 | 2/3 | 67 | 2.0 |
| 4 | 2/3 | 55 | 1.64 |
| 3 | 1/3 | 44 | 2.6 |
| 2 | 1/3 | 33 | 2.0 |
| 1 | 1/3 | 22 | 1.3 |

A key code determining means 122 is connected to the central processing unit 17 to determine the stitch formation as being valid or invalid on the basis of the key code of the stitch data in response to the number of stitches determined by the number-of-stitches determining means 124.

A size adjusting means 123 is connected to the central processing unit 17 to effect size adjustment through enlargement or reduction, in Table 2, with respect to the X, Y data for frame movement instructed on the basis of the coordinate data, in response to the input signal of magnification selected by the magnification selecting means 112. Enlargement and reduction calculating magnification values are stored in this size adjusting means 123.

The configuration of the stitch data stored in a stitch data storage means 121 is identical to that of the first embodiment (FIG. 3), with the first four bits are allotted to the key code, the ensuing six bits to X data of the stitch coordinate data, and the last six bits to the Y data thereof.

In the number-of-stitches determining means 124, the first bit (B15) of the key code is determined to be 3/3 in terms of the number of stitches when a large pattern at one of dial graduation values 9 to 7 is selected, and this bit is set to be "1" when considered "valid" for data processing and to "0" when considered "invalid."

The second bit (B14) is determined to be ⅔ in terms of the number of stitches when a medium-size pattern at one of dial graduation values 6 to 4 is selected, and this bit is set to be "1" when it is used for data processing and to "0" when it is not.

The ensuing bit (B13) is determined to be ⅓ in terms of the number of stitches when a small pattern at one of dial graduation values 3 to 1 is selected, and this bit is set to be "1" when considered "valid" for data processing and to "0" when considered "invalid."

Since the other configurations are similar to those of the first embodiment, a description thereof will be omitted.

Next, a description will be given of the operation of the second embodiment. Namely, in accordance with the system program, after a pattern is selected, processing starts upon the operation of the dial of the magnification selecting means 112 and the operation of the starting means (not shown). In step (a) in FIG. 9, the key signal is read.

Figure 9:
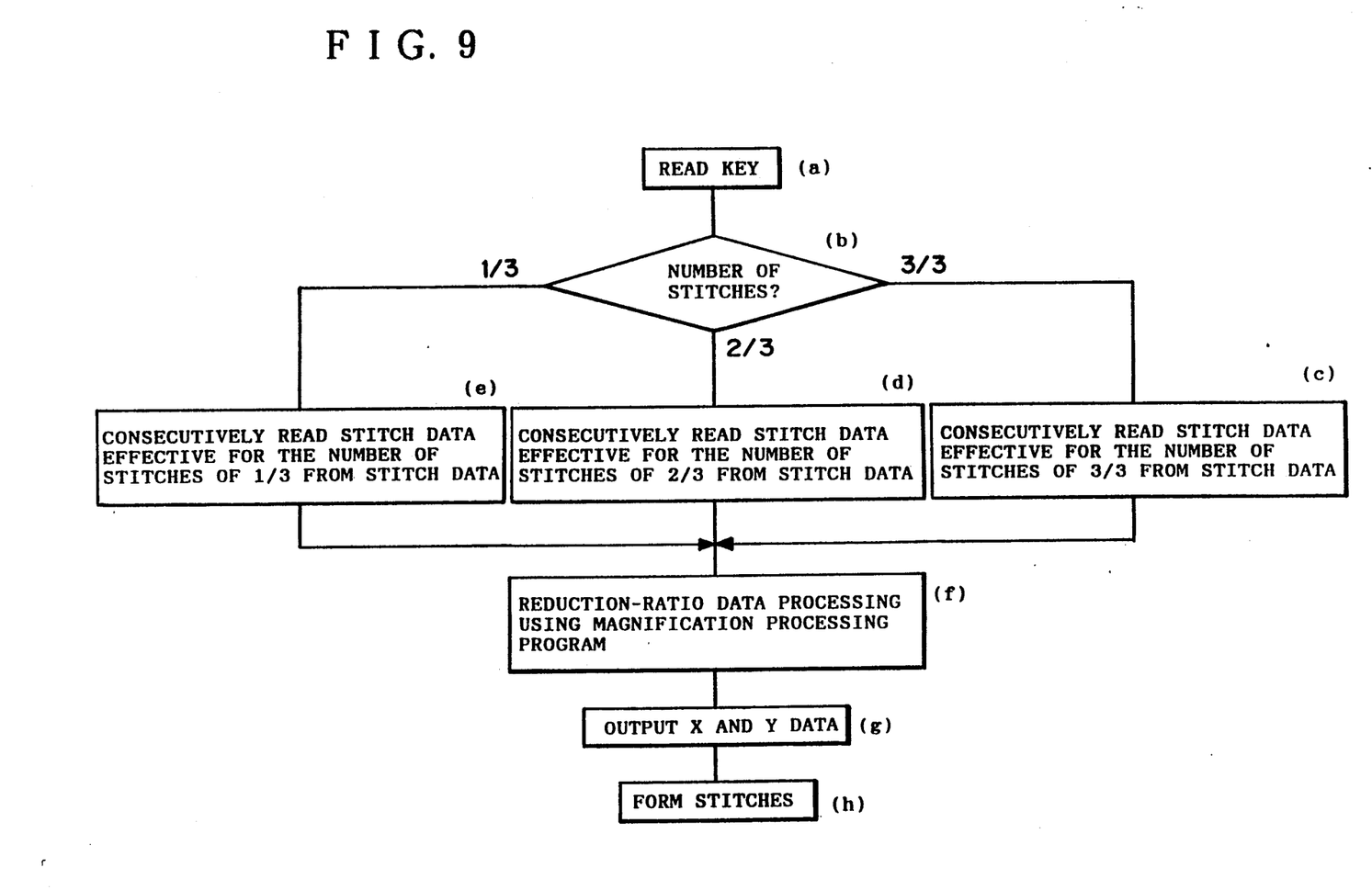
FIG. 9 is a flowchart illustrating a magnification selecting system in accordance with a second embodiment.

Then, in step (b), the number-of-stitches determining means 124 discriminates the signal from the magnification selection dial.

When a selection signal in which the graduation value 7 or more is selected and outputted, a determination is made that the number of stitches is 3/3. In step (c), stitch coordinate data which is provided with a key code for rendering the stitch formation valid is read from the stored stitch data.

Then, in step (f), the coordinate data values are subjected to size adjustment on the basis of the magnification (Table 2) corresponding to the dial value (magnification processing: calculation).

In step (g), the X and Y data are outputted to the stepping motor driving circuit 18, and the stepping motor 9 for controlling the X-axis direction and stepping motor 11 for controlling the Y-axis direction are driven in synchronism with the operation of the stitch forming mechanism, thereby forming a pattern.

If one of the graduation values 4 to 6 is selected by the magnification selecting means 112, and a selection signal is outputted therefrom, in step (b) a determination is made that the number of stitches is ⅔ processing. In step (d), stitch coordinate data which are provided with an effective key code is read from the stored stitch data.

Then, in step (f), the coordinate data values are subjected to size adjustment on the basis of the magnification (Table 2) selected (magnification processing: calculation).

In step (g), the X and Y data are outputted to the stepping motor driving circuit 18, and the stepping motor 9 for controlling the X-axis direction and the stepping motor 11 for controlling the Y-axis direction are driven in synchronism with the operation of the stitch forming mechanism, thereby forming a pattern.

If the graduation value of 3 or less is selected by the magnification selecting means 112, and a selection signal is outputted therefrom, in step (b) a determination is made that the number of stitches is ⅓ processing. In step (e), stitch coordinate data which are provided with an effective key code is read from the stored stitch data. At the same time, in step (f), the coordinate data values are subjected to size adjustment on the basis of the magnification (Table 2) selected (magnification processing: calculation).

In step (g), the X and Y data are outputted to the stepping motor driving circuit 18, and the stepping motor 9 for controlling the X-axis direction and stepping motor 11 for controlling the Y-axis direction are driven in synchronism with the operation of the stitch forming mechanism, thereby forming a pattern.

A description will now be given of the detailed operation of this invention, with an example in which the pattern in FIG. 4 is formed.

In FIG. 4, stitch data 0 to 35 are configured as in Table 1, and the key codes B15 to B12 are data for setting "valid" and "invalid" switches when the number of stitches 3/3, ⅔, ⅓ is determined. B11 to B0 are stitch coordinate data.

An outline of the operation is depicted in FIG. 9. In step (a), an instruction from the magnification selecting means (dial values 1-9) is read. In step (b), a determination of the flag is made with respect to the number of stitches.

After the determination and setting, effective stitch data are read in ensuing steps (c), (d), and (e). In step (f), magnification processing is effected by applying the enlargement/reduction rate (%) corresponding to the respective dial values in Table 2, with respect to the stitch data read. In step (g), the data is outputted to effect stitch formation in step (h).

First, a description will be given by citing an example in which the graduation value 9 of the magnification dial is selected. As for the detail operation, a description will be given with reference to FIG. 5.

Upon operation of the magnification selecting means 112, the magnification signal is read in step (a). Then, in step (b), the "magnification flag" for determining the number of stitches is set.

When the graduation value is 7 or more, the "full-size flag" is set, when it is 4 or more and 6 or less, the "⅔-fold flag" is set, and when it is 3 or less, the "⅓-fold flag" is set.

Then, in step (f), an enlargement/reduction rate "110%" corresponding to the graduation value "9" is read from Table 2, and is outputted and displayed.

Then, in step (g), data at the first data address are read, and the magnification flag is determined in an ensuing step (h).

Since the flag is the "full-size" flag (3/3), the "key code" B15 is looked up in step (i).

Since B15 at the address A0 is "1," as shown in Table 1, it is determined to be "valid," and X data and Y data are subjected to data processing in step (l).

Since the address A0 represents first stitch data, in step (p) the coordinate data are outputted as is, to form a stitch.

In step (q), a determination is made as to whether or not processing ends, and if it does not end, the data address is updated in step (s).

Since B15 of A1 is also "1" and "valid," X data and Y data are similarly subjected to data processing in step (l).

That is, the difference between the coordinate data of A0 and the coordinate data of A1 in both X- and Y-directions is subjected to 110% magnification processing to calculate an amount of output, which is outputted in step (p), to form a stitch.

In step (q), a determination is made as to whether or not processing ends, and if it does not end, in step (s) the data address is updated and the stitch data at an ensuing address A2 is read.

Since B15 of A2 and A3 is "1" and "valid," data processing is carried out in step (l) in which the difference with the previous coordinate data is subjected to 110% magnification processing to calculate an amount of output and is outputted in step (p), to form a stitch.

In step (q), a determination is made as to whether or not processing ends, and if it does not end, in step (s) the data address is updated and the stitch data at an ensuing address A4 is read.

Since B15 of A4 is "0," a determination is made that it is "invalid," so that the operation jumps immediately to step (s) to update the data address, and the stitch data at an ensuing address A5 is read.

Since B15 of A5 is also "0" and "invalid," the operation jumps immediately to step (s) to update the data address, and the stitch data at an ensuing address A6 is read.

Since B15 of A6 is "1" and "valid," data processing is carried out in Step (l).

Namely, the difference between the previously effective coordinate data of A3 and the coordinate data of A6 in both X- and Y-directions is subjected to 110% magnification processing to calculate an amount of output, which is outputted in step (p), to form a stitch.

Thereafter, in the same manner, the coordinate data is set to be "valid" in the case of "1" and "invalid" in the case of "0" in accordance with the key code of B15, and 110% magnification processing is effected, whereby an embroidery pattern corresponding to the selected magnification of the dial graduation "9" is formed.

Next, a description will be given of a case where the graduation value selected by the magnification selecting means is 6. Upon operation of the magnification selecting means 112, the magnification signal is read in step (a). Then, in step (b), the "magnification flag" for determining the number of stitches is set.

Since the graduation value is 6 and the number of stitches is ⅔, the "⅔-fold flag" is set.

In step (f), an enlargement/reduction rate "77%" corresponding to the graduation value "6" is read from Table 2, and outputted and displayed.

Then, in step (g), data at the first data address are read, and the magnification flag is determined in an ensuing step (h).

Since the flag is the "⅔-fold flag," the "key code" B14 is looked up in step (j).

Since B14 at the address A0 is "1," as shown in Table 1, it is determined to be "valid," and X data and Y data are subjected to data processing in step (m).

That is, since the address A0 represents first stitch data, in step (p) the coordinate data are outputted as is to form a stitch.

In step (q), a determination is made as to whether or not processing ends, and if it does not end, the data address is updated in step (s), and the stitch data at an ensuing address A1 is read.

Since B14 of A1 is also "1" and "valid," X data and Y data are subjected to data processing in step (m).

That is, the difference between the coordinate data of A0 and the coordinate data of A1 in both X- and Y-directions is subjected to 77% magnification processing to calculate an amount of output, which is outputted in step (p), to form a stitch.

In step (q), a determination is made as to whether or not processing ends, and if it does not end, in step (s) the data address is updated and the stitch data at an ensuing address A2 is read.

Since B14 of A2 is "0," a determination is made that it is "invalid," so that the operation jumps immediately to step (s) to update the data address, and the stitch data at an ensuing address A3 is read.

Since B14 of A3 is also "0" and "invalid," the operation jumps immediately to step (s) to update the data address, and the stitch data at an ensuing address A4 is read.

Since B14 of A4 is "1" and "valid," data processing is carried out in Step (m).

Namely, the difference between the coordinate data of A1 and the coordinate data of A4 in both X- and Y-directions is subjected to 77% magnification processing to calculate an amount of output, which is outputted in step (p), to form a stitch.

Thereafter, in the same manner, the coordinate data is set to be "valid" in the case of "1" and "invalid" in the case of "0" in accordance with the key code of B14, and 77% magnification processing is effected, whereby an embroidery pattern corresponding to the selected magnification of the dial graduation "6" is formed.

Next, a description will be given of a case where the graduation value selected by the magnification selecting means is 3. Upon operation of the magnification selecting means 112, the key signal is read in step (a). Then, in step (b), a determination is made of the magnification selected.

With respect to the selection signal of the graduation value 3, since the number of stitches is ⅓, the "⅓-fold flag" is set in step (e).

Then, in step (f), a signal is outputted to the magnification displaying means 16 to display a reduction rate "44%."

Then, in step (g), data at the first data address are read, and the magnification flag is determined in an ensuing step (h).

Since the flag is the "⅓-fold flag," the "key code" B13 is looked up in step (k).

Since B13 at the address A0 is "1," it is determined to be "valid," and X data and Y data are subjected to data processing in step (n).

Since the address A0 represents first stitch data, in step (p) the coordinate data are outputted as is, to form a stitch.

In step (q), a determination is made as to whether or not processing ends, and if it does not end, the data address is updated in step (s), and the stitch data at an ensuing address A1 is read.

Since B13 of A1 is also "1" and "valid," X data and Y data are subjected to data processing in step (n).

That is, the difference between the coordinate data of A0 and the coordinate data of A1 in both X- and Y-directions is subjected to 44% magnification processing to calculate an amount of output, which is outputted in step (p), to form a stitch.

In step (q), a determination is made as to whether or not processing ends, and if it does not end, in step (s) the data address is updated and the stitch data at an ensuing address A2 is read.

Since B13 of A2 is "0," a determination is made that it is "invalid," so that the operation jumps immediately to step (s) to update the data address, and the stitch data at an ensuing address A3 is read.

Since B13 of A3 to A7 is also "0," a determination is made that it is "invalid," so that the operation jumps consecutively to step (s) to update the data address, and the stitch data at an ensuing address A8 is read.

Since B13 of A8 is "1" and "valid," data processing is carried out in Step (n).

Namely, the difference between the coordinate data of A8 and the coordinate data of A1 in both X- and Y-directions is subjected to 44% magnification processing to calculate an amount of output, which is outputted in step (p), to form a stitch.

In step (q), a determination is made as to whether or not processing ends, and if it does not end, in step (s) the data address is updated and the stitch data at an ensuing address A9 is read.

Since B13 of A9 is "1" and "valid," data processing is carried out in Step (n).

Namely, the difference between the coordinate data of A9 and the coordinate data of A8 in both X- and Y-directions is subjected to 44% magnification processing to calculate an amount of output, which is outputted in step (p), to form a stitch.

In step (q), a determination is made as to whether or not processing ends, and if it does not end, in step (s) the data address is updated and the stitch data at an ensuing address A10 is read.

Since B13 of A10 is "0" and "invalid," the operation jumps immediately to step (s) to update the data address, and the stitch data at an ensuing address A11 is read.

Thereafter, in the same manner, the coordinate data is set to be "valid" in the case of "1" and "invalid" in the case of "0" in accordance with the key code of B13, and 44% magnification processing is effected, whereby an embroidery pattern corresponding to the selected magnification of the dial graduation 3 is formed.

As for the embroidery patterns thus formed, the number of stitches formed is reduced in three stages ranging from 9 to 1 in terms of the magnification selection dial value. At the same time, the coordinate data is subjected to magnification processing in conjunction with an increase or decrease in the dial value. Accordingly, while the size of the pattern is continuously adjusted, the stitch pitch P is formed within such a range that does not affect the stitch formation, with respect to the change in the size of the pattern.

It should be noted that although, in the first and second embodiments, a description has been given of the stitch coordinate data which are stored in the form of "absolute coordinates" for processing, so-called "relative coordinates," in which the stitch coordinates are stored as values of relative movement between one set of coordinates and another set, may be used. In this case, in addition to a method in which the "absolute values" are temporarily prepared, a method in which the "relative coordinates" are directly used may be adopted.

With regard to the above-described case, a description will be given of an example wherein the graduation value of the magnification selecting means 112 in the second embodiment is 3.

In step (b), the number of stitches is determined to be $\frac{1}{3}$, so that the "$\frac{1}{3}$-fold flag" is set.

Then, in step (f), the data at the first data address is read.

Then, in step (h), a determination is made of the magnification flag. Since the flag is the "$\frac{1}{3}$ flag," the "key code" B13 is looked up in step (k).

Since B13 at the address A0 is "1," it is determined to be "valid," and X data and Y data are subjected to data processing in step (n).

Since the address A0 represents first stitch data, in step (p) the coordinate data are outputted as is to form a stitch (in this case, the relative coordinates are 0,0). Then, in step (q), a determination is made as to whether or not processing ends, and if it does not end, the data address is updated in step (s), and the stitch data at an ensuing address A1 is read.

Since B13 of A1 is also "1" and "valid," X data and Y data are subjected to data processing in step (n).

That is, the coordinate data of A1 in both X- and Y-directions are subjected to 44% magnification processing to calculate an amount of output, which is outputted in step (p), to form a stitch.

In step (q), a determination is made as to whether or not processing ends, and if it does not end, in step (s) the data address is updated and the stitch data at an ensuing address A2 is read.

Since B13 of A2 is "0" and "invalid," the coordinate data are retained, the operation jumps immediately to step (s) to update the data address, and the stitch data at an ensuing address A3 is read.

Since B13 of A3 is also "0" and "invalid," the coordinate data are added to the previous coordinate data of A2, added values thereof are retained, the operation jumps immediately to step (s) to update the data address, and the stitch data at an ensuing address A4 is read.

Since B13 of A4 to A7 is also "0" and "invalid," the coordinate data are added, the operation jumps consecutively to step (s) to update the data address, and the stitch data at an ensuing address A8 is read.

Since B13 of A8 is "1" and "valid," data processing is carried out in Step (n).

Namely, the coordinate data of A8 are added to the coordinate data of A1 added above, and an amount of movement from A1 to A8 in both X and Y-directions is subjected to 44% magnification processing to calculate an amount of output, which is outputted in step (p), to form a stitch.

In step (q), a determination is made as to whether or not processing ends, and if it does not end, in step (s) the data address is updated and the stitch data at an ensuing address A9 is read.

Since B13 of A9 is "1" and "valid," data processing is carried out in Step (n).

Namely, the data of A9 in both X- and Y-directions is subjected to 44% magnification processing to calculate an amount of output, which is outputted in step (p), to form a stitch.

In step (q), a determination is made as to whether or not processing ends, and if it does not end, in step (s) the data address is updated and the stitch data at an ensuing address A10 is read.

Thereafter, in the same manner, the coordinate data are set to be valid in the case of "1" and the stitch formation is rendered invalid in the case of "0" in accordance with the key code of B13, and when the stitch formation is invalid, magnification processing is effected with respect to the added data, thereby forming an embroidery pattern corresponding to the magnification selected.

As described above, in accordance with the present invention, in a sewing machine in which all the stitch data are stored for embroidering, key codes for adjusting the size of patterns are associated with stitch data, and a measure is provided such that when a reduction adjustment is made, stitches of stitch data with a specific key code associated therewith are not formed. As the pattern is enlarged or reduced, even if the size is adjusted, the pitch of the stitches does not change substantially, so that stitches can be formed without causing thread breakage due to an otherwise small pitch.

In addition, when embroidery stitches are formed as in a conventional manner, the calculation of new stitch coordinates is not required, and in enlargement and reduction, an amount of movement of the embroidery frame can be obtained by simply performing enlargement or reduction processing with respect to the stitch data which are determined to be "valid." Accordingly, the stitch formation can be started immediately after selection of a pattern and a magnification. At the same time, a storage means for temporarily storing the stitch data determined conventionally by calculation is not required. Furthermore, since data of different sizes are not provided for the respective patterns, it is possible to reduce the storage capacity.

What is claimed is:

1. An apparatus for adjusting a size of a sewing machine pattern, said apparatus comprising:
    a stitch forming arrangement including a vertically movable needle and a needle-thread capturing means which cooperates with said needle;
    a central processing unit (CPU);
    rotational phase detecting means, connected to the CPU, for generating a timing signal in synchronism with a vertical motion of said needle;
    cloth moving means for relatively moving cloth relative to said needle in response to the timing signal;

stitch data storage means, connected to the CPU, for storing stitch data corresponding to each of a plurality of embroidery patterns;

pattern selecting means, connected to the CPU, for selecting a desired one of said plurality of patterns stored in said stitch data storage means;

display means for displaying the pattern selected;

magnification selecting means, connected to the CPU and capable of being manually operated, for adjusting the size of the pattern;

magnification displaying means, connected to the CPU, for displaying an adjustment value selected by said magnification selecting means;

key code discriminating means, connected to the CPU, for determining whether the stitch data is valid or invalid on the basis of a relevant one of key codes respectively associated with a plurality of items of stitch data for forming the pattern in correspondence with the adjustment value selected; and size adjusting means, connected to the CPU, for adjusting the size of the pattern in correspondence with the adjustment value selected, wherein size adjustment is made with respect to stitch data which are consecutively read and determined to be valid.

2. An apparatus for adjusting the size of a sewing machine pattern according to claim 1, wherein said cloth moving means is a driving means for moving an embroidery frame with the cloth stretched thereon in an X-axis direction and Y-axis direction perpendicular thereto.

3. An apparatus for adjusting the size of a sewing machine pattern according to claim 1, wherein the plurality of items of stitch data, whose validity is determined by said key code discriminating means, are respectively generated by reference to both the key codes and coordinate data.

4. An apparatus for adjusting the size of a sewing machine pattern according to claim 2, wherein the plurality of items of stitch data, whose validity is determined by said key code discriminating means, are respectively generated by reference to both the key codes and coordinate data.

5. An apparatus for adjusting the size of a sewing machine pattern, said apparatus comprising:

a stitch forming arrangement including a vertically movable needle and a needle-thread capturing means which cooperates with said needle;

a central processing unit (CPU);

rotational phase detecting means, connected to the CPU, for generating a timing signal in synchronism with a vertical motion of said needle;

cloth moving means for moving an embroidery frame with cloth stretched thereon in an X-axis direction and in a Y-axis direction perpendicular thereto in response to the timing signal;

stitch data storage means, connected to the CPU, for storing stitch data corresponding to each of a plurality of embroidery patterns;

pattern selecting means, connected to the CPU, for selecting a desired one of said plurality of patterns stored in said stitch data storage means;

display means for displaying the pattern selected;

magnification selecting means, connected to the CPU and capable of being manually operated, for adjusting the size of the pattern;

magnification displaying means, connected to the CPU, for displaying an adjustment value selected by said magnification selecting means;

number-of-stitches determining means, connected to the CPU, for classifying the number of stitches into one of a plurality of stages in correspondence with the adjustment value selected;

key code discriminating means, connected to the CPU, for determining whether the stitch data is valid or invalid on the basis of a relevant one of key codes respectively associated with a plurality of items of stitch data for forming the pattern in correspondence with the number of stitches determined; and size adjusting means, connected to the CPU, for adjusting the size of the pattern in correspondence with the adjustment value selected, wherein size adjustment is made with respect to stitch data which are consecutively read and determined to be valid.

6. An apparatus for adjusting the size of a sewing machine pattern according to claim 5, wherein said cloth moving means is a driving means for moving an embroidery frame with the cloth stretched thereon in an X-axis direction and in a Y-axis direction perpendicular thereto.

7. An apparatus for adjusting the size of a sewing machine pattern according to claim 5, wherein the plurality of items of stitch data whose validity is determined by said key code discriminating means, are respectively to both the key codes and coordinating data.

* * * * *